(12) United States Patent
Misaki et al.

(10) Patent No.: US 7,946,610 B2
(45) Date of Patent: May 24, 2011

(54) ARRANGEMENT OF AN AIR BAG MODULE ON A MOTORCYCLE, AND MOTORCYCLE INCORPORATING SAME

(75) Inventors: Kenichi Misaki, Saitama (JP); Kazuyoshi Kuroki, Saitama (JP); Takeshi Kuroe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 12/378,021

(22) Filed: Feb. 10, 2009

(65) Prior Publication Data
US 2009/0206583 A1 Aug. 20, 2009

(30) Foreign Application Priority Data

Feb. 19, 2008 (JP) .................................. 2008-037485

(51) Int. Cl.
*B60R 21/215* (2011.01)
(52) U.S. Cl. ...................................... 280/728.2; 180/225
(58) Field of Classification Search ............... 280/730.1, 280/728.2; 180/218, 219, 225, 314
See application file for complete search history.

(56) References Cited

U.S. PATENT DOCUMENTS

| 5,938,231 | A  | * | 8/1999  | Yamazaki ............... | 280/730.1 |
| 5,967,545 | A  | * | 10/1999 | Iijima et al. ............. | 280/730.1 |
| 6,971,666 | B2 | * | 12/2005 | Akiyama et al. ......... | 280/729   |
| 7,029,029 | B2 | * | 4/2006  | Yamazaki et al. ........ | 280/730.1 |
| 7,556,283 | B2 | * | 7/2009  | Horiuchi et al. .......... | 280/728.2 |
| 7,559,566 | B2 | * | 7/2009  | Fujita ...................... | 280/284   |
| 7,562,900 | B2 | * | 7/2009  | Miyata .................... | 280/730.1 |
| 7,648,159 | B2 | * | 1/2010  | Miyata et al. ............ | 280/730.1 |
| 7,744,119 | B2 | * | 6/2010  | Iijima ....................... | 280/730.1 |
| 2003/0132616 | A1 | * | 7/2003 | Yanagibashi et al. .... | 280/730.1 |
| 2003/0189323 | A1 | * | 10/2003 | Akiyama et al. ......... | 280/729   |
| 2003/0214121 | A1 | * | 11/2003 | Miyata et al. ............ | 280/730.1 |
| 2006/0124372 | A1 | * | 6/2006  | Ishida et al. ............. | 180/228   |
| 2007/0085307 | A1 | * | 4/2007  | Horiuchi .................. | 280/730.1 |
| 2009/0242304 | A1 | * | 10/2009 | Tahara et al. ............ | 180/219   |
| 2010/0270778 | A1 | * | 10/2010 | Hanafusa et al. ........ | 280/728.2 |

FOREIGN PATENT DOCUMENTS

| DE | 93 10 544.4    | 9/1993  |
| JP | 6-199261 A     | 7/1994  |
| JP | 9-328087       | 12/1997 |
| JP | 3503889        | 12/2003 |
| JP | 2004-136790 A  | 5/2004  |
| JP | 2007-069793    | 3/2007  |
| JP | 2007-083882 A  | 4/2007  |

* cited by examiner

*Primary Examiner* — Faye M. Fleming
*Assistant Examiner* — Karen A Beck
(74) *Attorney, Agent, or Firm* — Carrier, Blackman & Associates, P.C.; William D. Blackman; Joseph P. Carrier

(57) ABSTRACT

A motorcycle includes main frames extending from a head pipe to rear left and right sides, a fuel tank provided between the main frames, seat frames extending rearwardly from the main frames; a seat supported by the seat frames; and an air bag module disposed at a position proximate to a front upper portion of the seat. The air bag module may be disposed in a recess formed on a rear upper portion of the fuel tank, and is mounted on stay members extending respectively upwardly from the left and right main frames.

14 Claims, 7 Drawing Sheets

EMBODIMENT

COMPARATIVE EXAMPLE

ARRANGEMENT OF AN AIR BAG MODULE
ON A MOTORCYCLE, AND MOTORCYCLE
INCORPORATING SAME

CROSS-REFERENCE TO RELATED APPLICATIONS

The present application claims priority under 35 USC §119 based on Japanese patent application No. 2008-037485, filed on Feb. 19, 2008. The entire subject matter of this priority document, including specification, claims and drawings thereof, is incorporated by reference herein.

BACKGROUND OF THE INVENTION

1. Field of the Invention

The present invention relates to an arrangement of an air bag module on a motorcycle. More particularly, the present invention relates to a motorcycle incorporating an air bag module disposed in a recess formed on an upper portion of a fuel tank, at a position proximate to a front portion of a seat of the motorcycle.

2. Description of the Background Art

There is a known motorcycle having an air bag module provided in front of a rider's seat. An example of such motorcycle is disclosed in the Japanese Laid-Open Patent No. 2007-69793, specifically in FIG. 7 thereof.

According to the Japanese Laid-Open Patent No. 2007-69793 (with reference to FIG. 7 thereof), the motorcycle includes an air bag module 20 (the reference symbols used in the Japanese Patent Laid-Open No. 2007-69793 are the same as those used in this discussion) having an air bag, a fuel tank 30 disposed behind the air bag module 20, and a main seat 10 for rider(s) disposed behind the fuel tank 30.

The air bag and belt stays 52 provided on a vehicle body of the motorcycle are connected by support belts 51 for holding the inflated air bag in a predetermined position upon inflation of the air bag.

According to the Japanese Patent Laid-Open No. 2007-69793, the fuel tank 30 is disposed between the air bag module 20 and the main seat 10, and the support belts 51 for holding the air bag in a predetermined position after inflation of the air bag are provided. It is desirable to substitute such support belts for holding the air bag upon inflation thereof.

The present invention has been made to overcome such drawbacks of the arrangement of an air bag module on a motorcycle. Accordingly, it is an object of the present invention to provide motorcycle having substitute support structures, for use in place of support belts, and for holding an air bag in a position where it is inflated.

SUMMARY OF THE INVENTION

In order to achieve the above objects, the present invention according to a first aspect thereof provides a motorcycle including a head pipe, main frames extending toward the rear left and right sides from the head pipe, a fuel tank disposed between the left and right main frames, seat frames extending rearwardly from rear end portions of the main frames, a seat supported by the seat frames, and an air bag module disposed at a position proximate to the front side portion of the seat.

The present invention according to the first aspect is characterized in that the air bag module is disposed on the upper side of a rear portion of the fuel tank, and is mounted on stay members extending upwardly from the left and right main frames.

The present invention according to a second aspect thereof is characterized in that an upper surface of a rear portion of the fuel tank has a recess formed therein, and that the air bag module is disposed in the recess.

The present invention according to a third aspect thereof is characterized in that the fuel tank, the air bag module, and the stay members are collectively covered with a tank cover.

The invention according to a fourth aspect thereof is characterized in that the tank cover is provided, at its portion facing the air bag module, with a fragile member inclusive of a notch element.

The present invention according to a fifth aspect thereof is characterized in that the seat frames are provided respectively on the left and right sides, a fuel sub-tank is disposed between the left and right seat frames when viewed from the upper side of the vehicle, the fuel sub-tank is provided with a fuel pump for feeding out a fuel to the engine, the fuel tank and the fuel sub-tank are connected to each other with a pipe through which the fuel is supplied from the fuel tank to the sub-fuel tank, and the fuel is supplied from the fuel sub-tank to the engine by the fuel pump.

Effects of the Invention

According to the first aspect of the present invention, the air bag module is disposed on the rear upper side portion of the fuel tank. Therefore, the air bag module can be disposed closer to the rider, as compared with an arrangement in which the air bag module is disposed in front of the fuel tank. With the air bag module disposed closer to the rider, the air bag can be inflated in a predetermined position, without using any support belt that is connected between the vehicle body and the air bag so as to hold the air bag in the predetermined position upon inflation of the air bag.

According to the second aspect of the present invention, the upper surface of the rear portion of the fuel tank is provided with a recess formed therein, and the air bag module is disposed in the recess. Therefore, the air bag module can be disposed so as not to project from the upper surface of the fuel tank. When the air bag module can be disposed so as not to project from the upper surface of the fuel tank, ruggedness in the upper surface of the fuel tank can be suppressed, the upper surface of the fuel tank can be kept neat, and the appearance quality of the fuel tank and the surroundings can be improved.

In addition, with the air bag module disposed in the recess formed in the upper surface of the rear portion of the fuel tank, the air bag at the time of inflation is inflated toward the rider's side, and the air bag can be efficiently inflated without using any support belt.

According to the third aspect of the present invention, the fuel tank, the air bag module, and the stay members are collectively covered with a tank cover. Therefore, the appearance quality of the fuel tank and the surroundings can be largely enhanced, while permitting the air bag module to be disposed in the vicinity of the rider.

According to the fourth aspect of the present invention, the tank cover is provided, at its portion facing the air bag module, with a fragile member inclusive of a notch element. When in a non-operating state, the air bag module is covered with the tank cover, so that the appearance quality of the vehicle can be maintained. When the air bag module is operated, an opening is formed along the fragile member due to the expansion of the air bag, so that the air bag can be put into expansion and inflation smoothly.

According to the fifth aspect of the present invention, the seat frames are provided respectively on the left and right sides, and a fuel sub-tank is disposed between the left and right seat frames as viewed from the upper side of the vehicle.

Therefore, the reduction in the capacity for fuel due to provision of the recess in the fuel tank can be compensated for by the fuel sub-tank.

In addition, with the fuel sub-tank and a fuel supply system disposed close to the engine, both a lowering in the center of gravity of the vehicle and concentration of mass can be promised. With both the lowering of the center of gravity and concentration of mass realized, the driveability of the vehicle can be further enhanced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Illustrative embodiments for carrying out the present invention are described below, based on the accompanying drawings.

Figure 1:
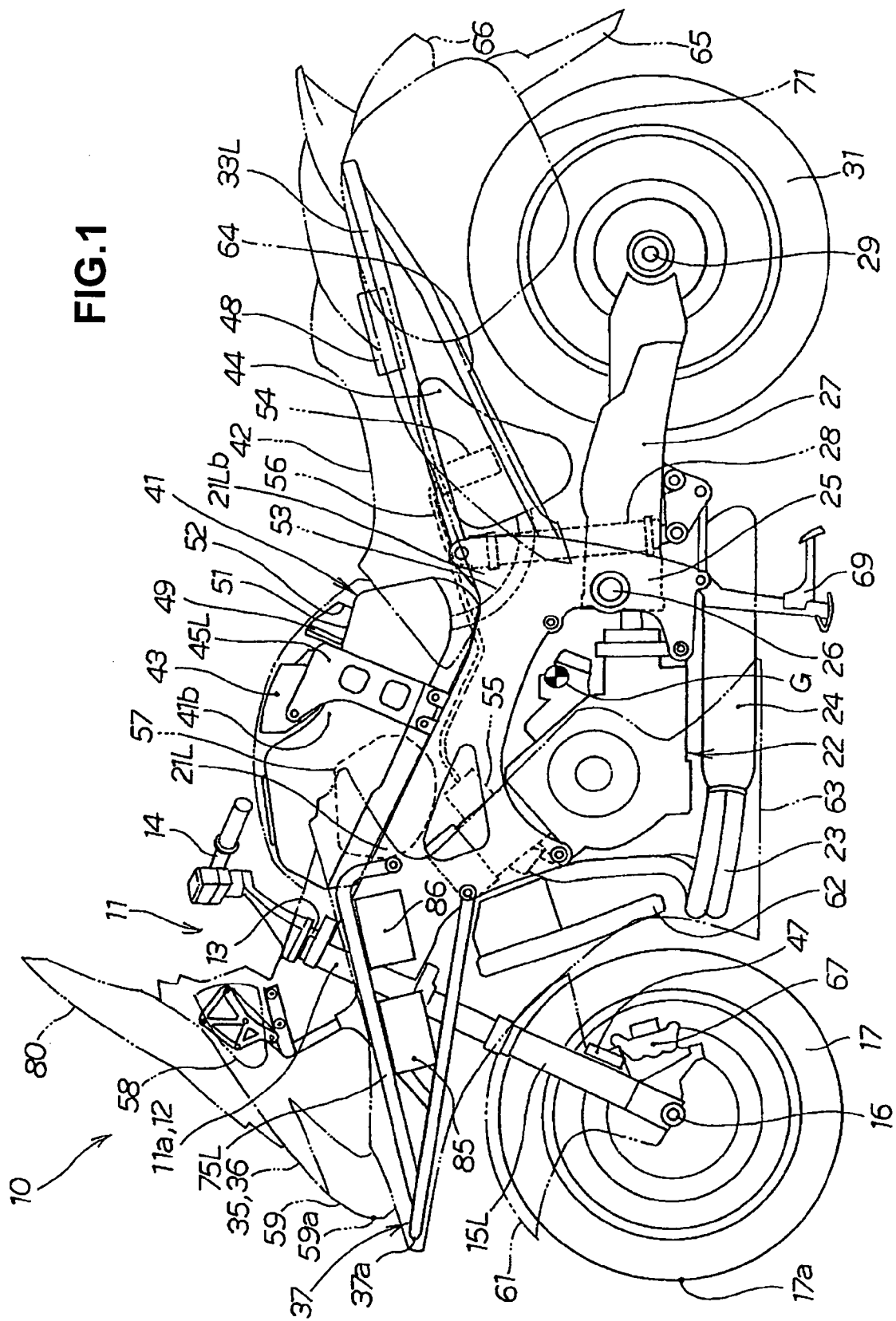
FIG. 1 is a left side view of a motorcycle according to the present invention.

FIG. 1 is a left side view of a motorcycle according to the present invention. The motorcycle 10 includes, as main components thereof, a head pipe 12a, a steering handle 14, left and right front forks 15L, 15R, a front wheel 17, main frames 21L, 21R, an engine 22, an exhaust pipe 23, a muffler 24, a pivot member 25, a rear swing arm 27, a rear cushion unit 28, a rear wheel axle 29, a rear wheel 31 and seat frames 33L, 33R.

The head pipe 12 is provided at a front end portion 11a of a body frame 11. The steering handle 14 is turnably provided at the head pipe 12 through a steering shaft 13. The left and right front forks 15L, 15R (only 15L on the viewer's side of the drawing is shown here and hereinafter) connected to the steering shaft 13 and includes a cushion function for absorbing vibrations and the like that the vehicle receives from the road surface. The front wheel 17 is turnably mounted to a front wheel axle 16 bridgingly arranged between lower end portions of the front forks 15L, 15R.

The main frames 21L, 21R (only 21L on the viewer's side is shown in the drawings) are extended toward the rear left and right sides from the head pipe 12. The engine 22 is suspended from the main frames 21L, 21R. The exhaust pipe 23 is extended from the engine 22. The muffler 24 is connected to the exhaust pipe 23. The pivot member 25 is provided at rear lower portions of the main frames 21L, 21R.

The pivot shaft 26 is provided at the pivot member 25. The rear swing arm 27 is extended rearwardly from the pivot shaft 26, and has a power transmission unit incorporated therein. The rear cushion unit 28 is provided between the rear swing arm 27 and the main frames 21L, 21R, and adapted to support the rear swing arm 27 so as to permit the latter to swing about the pivot shaft 26.

The rear wheel axle 29 is provided at a rear end portion of the rear swing arm 27. The rear wheel 31, which is a drive wheel, is rotatably mounted to the rear wheel axle 29. The seat frames 33L, 33R (only 33L on the viewer's side is shown in the drawing) are extended toward the rear upper side from rear end portions of the main frames 21L, 21R.

The layout of components pertaining to an upper portion of the motorcycle is described below.

The motorcycle 10 includes the main frames 21L, 21R extended toward the rear left and right sides from the head pipe 12; a fuel tank 41 disposed between the left and right main frames 21L, 21R; the seat frames 33L, 33R extended rearwardly from rear end portions 21Lb, 21Rb (only 21Lb on the viewer's side is shown in the drawing) of the main frames 21L, 21R; a seat 42 supported by the seat frame 33L, 33R so as to seat the rider(s) thereon; and an air bag module 43 provided at a position proximate to the front top portion of the seat 42.

The air bag module 43 is disposed on the upper side of a rear portion 41b of the fuel tank 41, and is attached to stay members 45L, 45R (only 45L on the viewer's side of the drawing is shown) extended upwardly from the left and right main frames 21L, 21R.

In the air bag module 43, an air bag (described later) is accommodated in a folded state. In order to inflate the air bag at a predetermined time, a shock sensor 47 for detecting a shock exerted on the motorcycle 10 upon collision of the motorcycle 10, serving as a vehicle, is disposed on the front fork 15L, and an air bag control unit 48 for controlling the inflation time of the air bag on the basis of a signal obtained through detection by the shock sensor 47 or the like is disposed at a lower rear portion of the seat 42. The air bag module 43, the shock sensor 47 and the air bag control unit 48 are connected together with a harness (not shown).

A storage space 51 adapted to receive small things such as a wallet and an ETC unit 49 therein is provided on the upper side of a rear portion of the fuel tank 41 and on the rear side of the air bag module 43. A small-thing container 52 utilizing the storage space 51 is provided, thereby enhancing the utility for the rider(s).

A fuel supply system of the motorcycle is described below.

A fuel sub-tank 44 is disposed on the rear lower side of the fuel tank 41 and on the lower side of the seat 42, between the left and right seat frames 33L, 33R, when viewed from the upper side of the vehicle. A fuel pump 54 for feeding out a fuel to the engine 22 is disposed inside the fuel sub-tank 44. The fuel tank 41 and the fuel sub-tank 44 are connected to each other by a pipe 53 for supplying the fuel to the fuel sub-tank 44 from the fuel tank 41. The fuel pump 54 is connected through a fuel hose 56 to a fuel supply system 55 disposed at an intake unit of the engine 22. The intake unit supplies a fuel-air mixture to the engine.

According to the above configuration, the fuel from the fuel tank 41 is fed into the fuel sub-tank 44, is further fed through the fuel pump 54 and the fuel hose 56, and is supplied to the engine 22 through the fuel supply system 55 provided in the vicinity of the engine 22. An air cleaner 57 is positioned so as to partially overlap with the fuel tank 41 when viewed in side view. The air cleaner 57 supplies filtered air to the fuel supply system 55.

The motorcycle 10 further includes a side mirror 58 attached to the front cowl 36 for the rider to seek rearward views, a head light 59, a front fender 61, a radiator unit 62, a main cowl 63, a rear cowl 64, a rear fender 65, a tail lamp 66, a front disk brake unit 67, a main stand 69, a side trunk 71 attached to the seat frame 33L for storing luggage therein.

Now, a cowl stay 37 provided at a front part of the vehicle is described below.

The motorcycle 10 is provided with the cowl stay 37 which is extended toward the front side of the left and right main frames 21L, 21R and which supports the front cowl 36 serving as a cowling 35 covering the vehicle.

The cowl stay 37 is arranged such that, when viewed in a side view of the vehicle, a front end portion 37a thereof is located at position rearward of a front end portion 17a of the front wheel 17, and on the front side relative to a front end portion 59a of the head light 59 disposed in front of the head pipe 12 so as to illuminate the front side of the vehicle. The cowl stay 37 is disposed at a position above a center-of-gravity position G of the vehicle. The detailed structure of the cowl stay 37 is described later.

Figure 2:
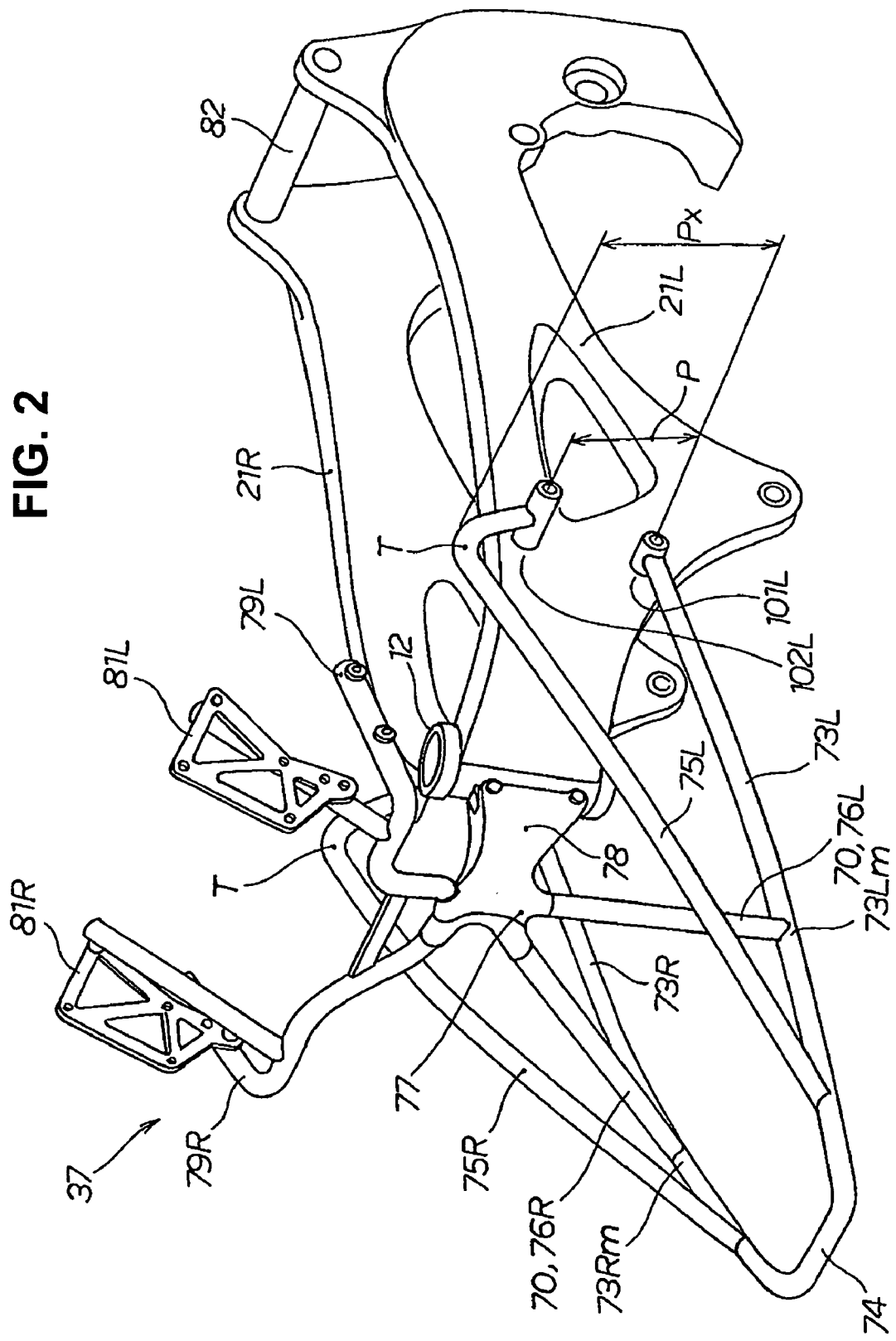
FIG. 2 is a perspective view of a cowl stay provided in the motorcycle according to the present invention.

FIG. 2 is a perspective view of the cowl stay 37 provided in the motorcycle according to the present invention.

The cowl stay 37 includes left and right main cowl stay members 73L, 73R extending substantially horizontally in a forward direction from the main frames 21L, 21R; a cross member 74 connecting the front ends of the main cowl stay members 73L, 73R to each other; left and right slant members 75L, 75R for respectively connecting intermediate members 73Lm, 73Rm of the main cowl stay members 73L, 73R to the main frames 21L, 21R to thereby reinforce the main cowl stay members 73L, 73R; and lower arm members 76L, 76R as arm members 70 extended toward the inner upper side from the left and right main cowl stay members 73L, 73R.

The cowl stay 37 further includes a connection member 77 connecting the upper ends of the lower arm members 76L, 76R to each other; a center arm 78 extended from a front portion of the head pipe 12 to the connection member 77 so as to support the connection member 77; upper arm members 79L, 79R extended toward the left and right sides from the connection member 77; and left and right cowl brackets 81L, 81R which are provided at tip end portions of the upper arm members 79L, 79R and to which a front cowl 36 is attached. Thus, the cowl stay 37 is mounted to the main frames 21L, 21R and the head pipe 12. The main frames 21L, 21R are connected by a main cross member 82.

Here, connecting elements 101L, 101R (only the connecting element 101L on the viewer's side is shown in the drawing) at which the main cowl stay members 73L, 73R are mounted to the main frames 21L, 21R and connecting elements 102L, 102R (only the connecting element 102L on the viewer's side is shown in the drawing) at which the slant members 75L, 75R are mounted to the main frames 21L, 21R are different from each other. The connecting elements 102L, 102R and the connecting elements 101L, 101R are spaced apart from each other by a spacing P in a vehicle height direction.

Figure 3:
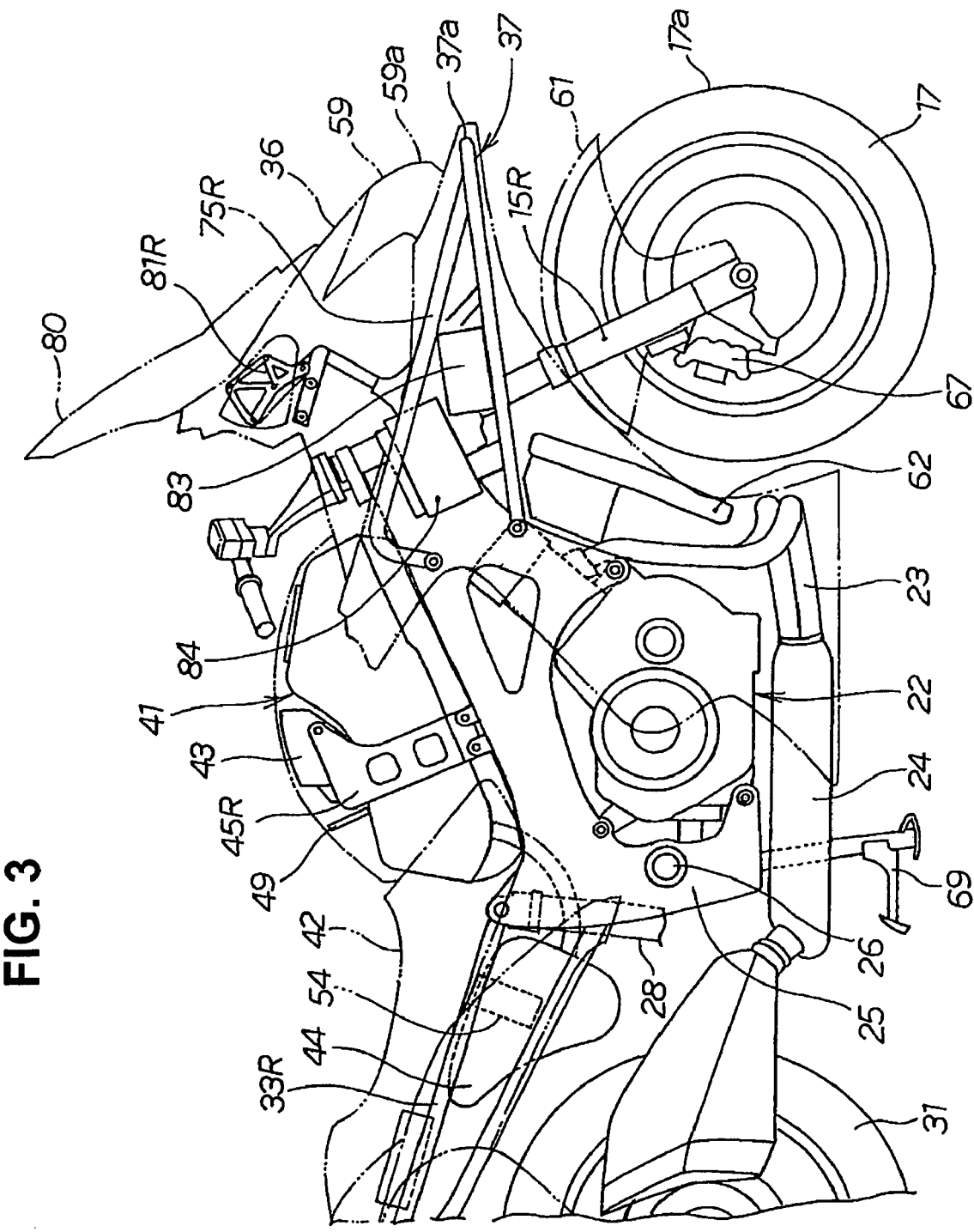
FIG. 3 is a side view of a right front portion of the motorcycle according to the present invention.

FIG. 3 is a side view of a right front portion of the motorcycle according to the present invention. In the cowl stay 37, a regulator 83 and a battery 84 are mounted to the right-side slant member 75R in this order from the front side toward the rear side.

Referring to FIGS. 1 to 3, the cowl stay 37 is mounted on the main frames 21L, 21R, so that the mounting strength of the cowl stay 37 can be enhanced largely, as compared to a configuration in which the cowl stay 37 is mounted only on the head pipe 12.

The front cowl 36 formed as one body with a shield 80 covering the front side of the rider is attached to the cowl brackets 81L, 81R, and the head light 59 is attached thereto through a bracket (not shown). An engine control unit 85 and an ABS control unit 86 on the rear side of the engine control unit 85 are mounted to the left-side slant member 75L of the cowl stay 37, in this order from the front side toward the rear side (FIG. 1). As discussed above, the regulator 83 and the battery 84 are mounted to the right-side slant member 75R of the cowl stay 37, in this order from the front side toward the rear side.

Accordingly, a desired center-of-gravity balance between the left and right portions of the motorcycle 10 can be secured. Also, since the cowl stay 37 is covered with the front cowl 36, the appearance quality of the vehicle can be kept good.

The cowl stay 37 includes the cross member 74 connecting the front ends of the main cowl stay members 73L, 73R to each other, and the left and right slant members 75L, 75R for connecting the intermediate portion 73Lm, 73Rm of the main cowl stay members 73L, 73R to the main frames 21L, 21R. Therefore, the strength of the cowl stay 37 can be enhanced, as compared with a case in which only the main cowl stay members 73L, 73R are provided to constitute the cowl stay 37.

In addition, by utilizing the main cowl stay members 73L, 73R and the slant members 75L, 75R, it is possible, for example, to mount the regulator, the battery and the control units to the slant members 75L, 75R or the like. Since various components can be mounted to the main cowl stay members 73L, 73R and the slant members 75L, 75R, the degree of freedom in layout of the components in a front portion of the vehicle can be significantly enhanced.

Figure 4:
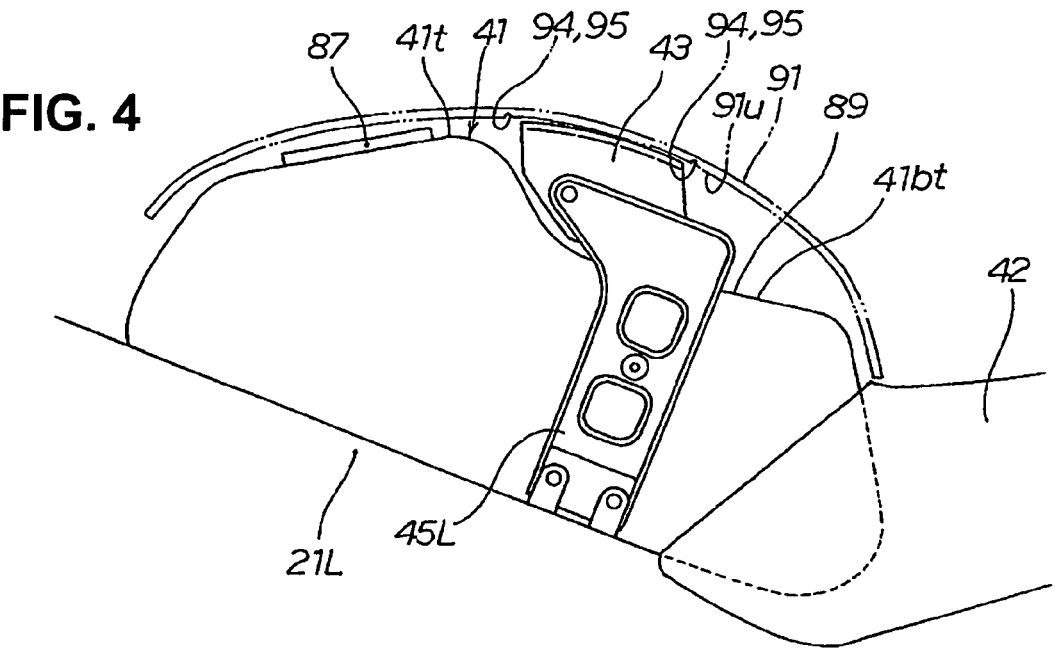
FIG. 4 is a side view of an air bag module disposed on an upper side of a rear portion of a fuel tank, and the surroundings thereof, according to the present invention.
Figure 5:
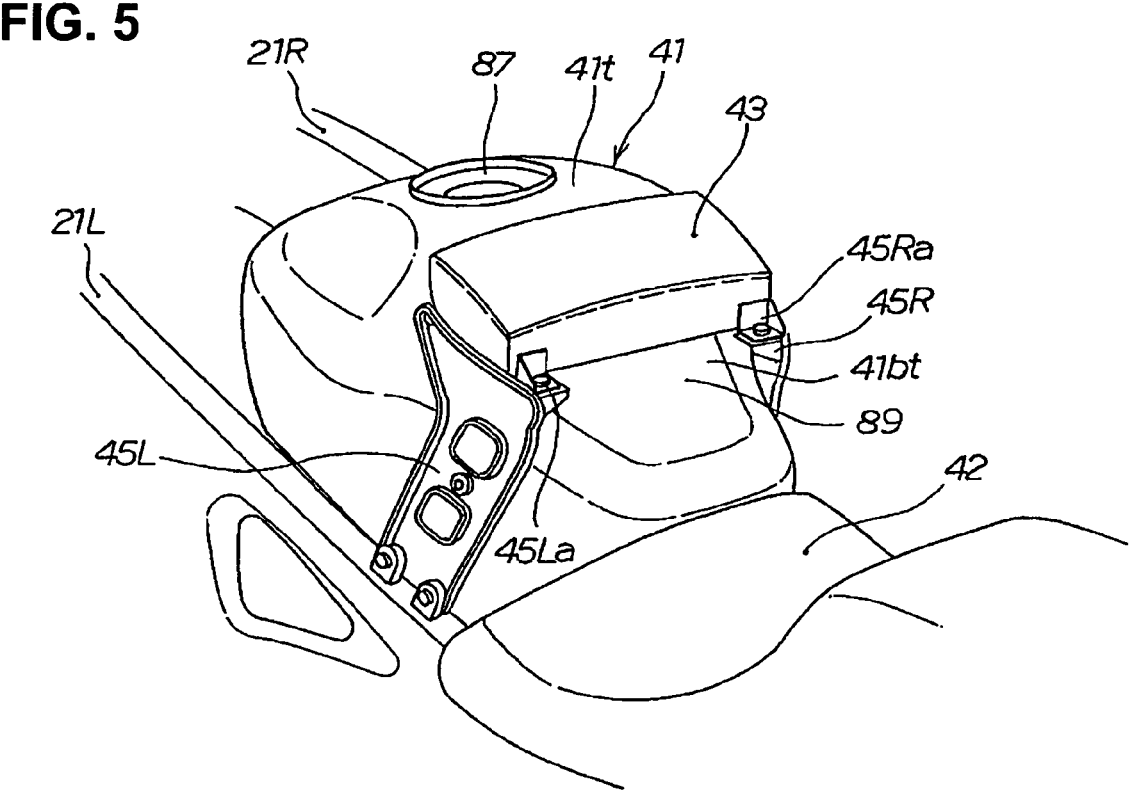
FIG. 5 is a perspective view of the air bag module disposed on the upper side of the rear portion of the fuel tank, and the surroundings thereof, according to the present invention.

FIG. 4 is a side view of the air bag module disposed on the upper side of a rear portion of the fuel tank according to the present invention and the surroundings of the air bag module, and FIG. 5 is a perspective view of the air bag module disposed on the upper side of the rear portion of the fuel tank according to the present invention and the surroundings of the air bag module. In FIG. 5, a tank cover 91 is not shown.

The fuel tank 41 is disposed between the left and right main frames 21L, 21R, and is mounted to the main frames 21L, 21R. The fuel tank 41 is provided with a fuel tank feed port 87 at a front portion thereof. The fuel tank has a recess 89 formed thereon at a rear portion upper surface 41bt thereof. The air bag module 43 is disposed in the recess 89.

More specifically, the air bag module 43 is mounted bridgingly between left and right upper end portions 45La, 45Ra of the stay members 45L, 45R extending upwardly from the left and right main frames 21L, 21R.

Since the recess 89 is provided at the rear portion upper surface 41bt of the fuel tank 41 and the air bag module 43 is disposed in the recess 89, the air bag module 43 is disposed such that the air bag module 43 does not project from the upper surface 41t of the fuel tank 41.

When the air bag module 43 disposed such that it does not project from the upper surface 41t of the fuel tank 41, ruggedness in the upper surface 41t of the fuel tank 41 can be suppressed, the upper surface 41t of the fuel tank 41 can be rendered neat, and the appearance quality of the fuel tank 41 and the surroundings thereof can be restrained from being lowered.

In addition, with the air bag module 43 disposed in the recess 89 formed at the rear portion upper surface of the fuel tank, the air bag at the time of inflation is inflated toward the rider, so that the air bag can be efficiently inflated without using any support belt.

In this embodiment, the fuel tank 41, the air bag module 43, and the stay members 45L, 45R are collectively covered with a tank cover 91. Therefore, the appearance quality of the fuel tank 41 and the surroundings can be enhanced largely, while permitting the air bag module 43 to be disposed in the vicinity of the rider.

Referring to FIG. 1, the seat frames 33L, 33R are provided respectively on the left and right sides, and the fuel sub-tank 44 is disposed between the left and right seat frames 33L, 33R as viewed from the upper side of the vehicle. Therefore, the reduction in the capacity of fuel due to the recess 89 provided in the fuel tank 41 can be compensated for by using the fuel sub-tank 44. Specifically, the reduction in the capacity of the fuel tank 41 due to the air bag module 43 contained in the recess 89 and to the air cleaner 57 so disposed as to overlap with the fuel tank 41 in side view can be compensated for by the fuel sub-tank 44.

In addition, the fuel sub-tank 44, accompanied by the fuel supply system 55, is disposed between the seat frames 33L, 33R. Therefore, when the fuel sub-tank 44 and the fuel supply system 55 are disposed in the vicinity of the engine 22, it is possible to realize both a lowering of the center of gravity G of the vehicle and concentration of mass. The lowering of the center of gravity G and the concentration of mass provides further enhancement in the driveability of the vehicle.

A lower surface 91u of the tank cover 91 is provided, at its portion facing the air bag module 43, with a fragile member 95 such as a notch element 94. The fragile member 95 is designed such that a portion on the side closer to the rider on the rear side in the front-rear direction of the vehicle is more fragile than a portion on the side remoter from the rider, whereby it is ensured that at the time of inflation of the air bag module 43, the air bag 97 can be inflated toward the rider's side.

Incidentally, while the fragile member 95 is the notch element 94 in this embodiment, the fragile member 95 may be a portion obtained by rendering the tank cover 91 thinner than the other portions.

The operation of the motorcycle having the air bag module and the cowl stay, as discussed above, is described below.

Figure 6A:
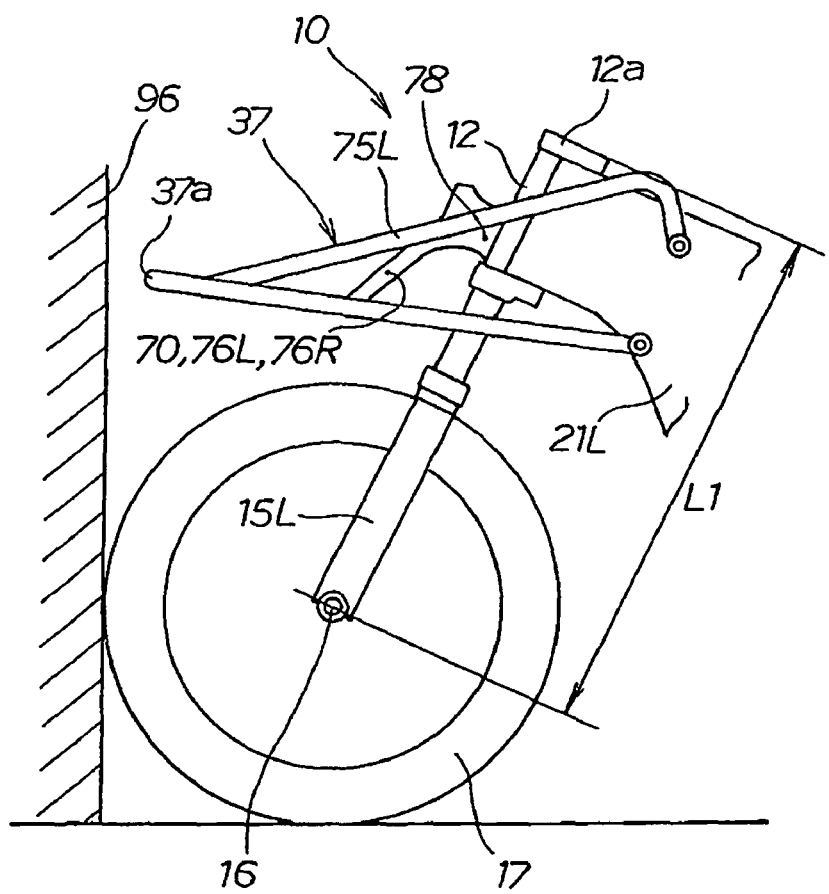
FIG. 6A in an illustration of an operation of the cowl stay, showing collision of a front wheel of the motorcycle against an object, according to the present invention.
Figure 6B:
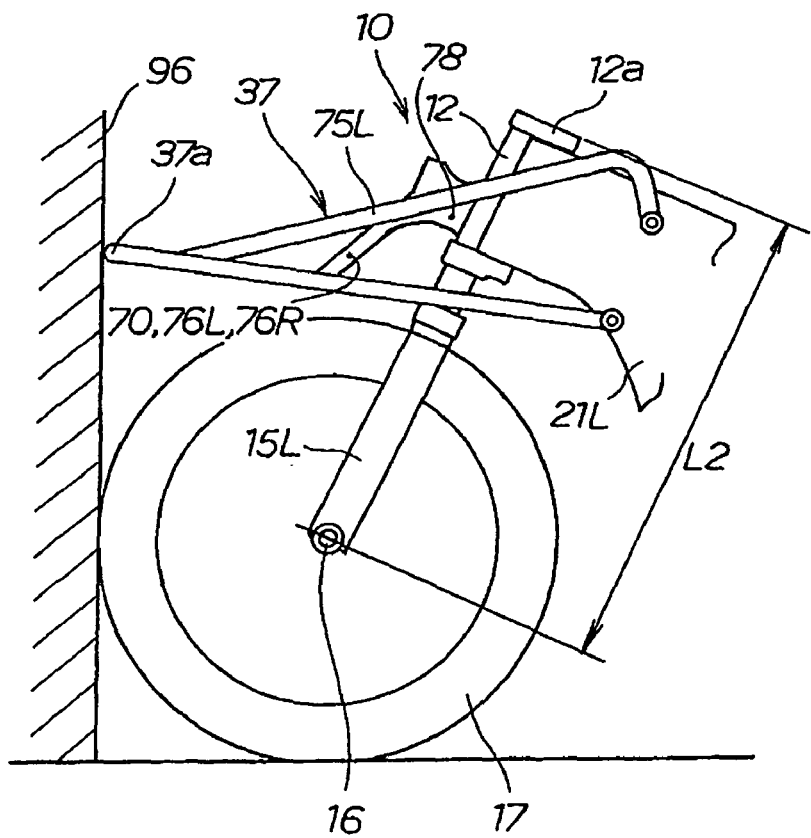
FIG. 6B in an illustration of an operation of the cowl stay, showing upon collision view having shrunk fork, according to the present invention.

FIGS. 6A and 6B illustrate the operation of the cowl stay according to the present invention.

FIG. 6A illustrates the collision of the front wheel 17 against an object 96, in the case where an excessively strong shock is exerted on the motorcycle 10, which serves as a vehicle, from the front side. In the FIG. 6A, the distance between the front wheel axle 16 and the upper end part 12a of the head pipe 12 is L1.

As shown in FIG. 6B, upon collision of the vehicle against the object 96, for absorbing the shock, the front forks 15L, 15R shrinks, and the vehicle body inclusive of the main frames 21L, 21R falls along the axial direction of the front forks 15L, 15R. In the FIG. 6B, the distance between the front wheel axle 16 and the upper end part 12a of the head pipe 12 is L2. It may be noted that L2<L1.

In an arrangement in which the motorcycle 10 receives an excessively strong impact force from the front side, the configuration in which the front forks 15L, 15R are disposed with their upper end portion inclined rearwards ensures that, upon receiving the shock, the main frames 21L, 21R fall along the axial direction of the front forks 15L, 15R and are moved forwards relative to the position of the front wheel 17, so that a front end part 37a of the cowl stay 37 collides against the object 96.

The cowl stay 37 itself has sufficiently desired strength, through provision of the reinforcing slant members 75L, 75R (only symbol 75L on the viewer's side is shown in the drawing) or the like. In addition, the cowl stay 37 is mounted to the main frames 21L, 21R and the head pipe 12 at the plurality of connecting elements 101L, 101R, 102L, 102R, so that a sufficient mounting strength is ensured. Consequently, the cowl stay functions as a front bumper of the motorcycle 10.

In an arrangement in which the cowl stay 37 configured as discussed above is disposed on the upper side of the front wheel 17 and an excessively strong shock is exerted from the front side, the shock upon the collision against the object 96 is received by two points including the front wheel 17 and the cowl stay 37. Therefore, the change in the attitude of the motorcycle 10 can be suppressed, as compared with the case where the shock is received by the front wheel 17 alone.

Now, the operation of the cowl stay 37 referring to FIG. 2 is described below.

The main cowl stay members 73L, 73R and the slant members 75L, 75R are mounted on the main frames 21L, 21R at the different connecting elements 101L, 101R, 102L, 102R. Therefore, when a shock is inputted to the main cowl stay members 73L, 73R from the front side, the slant members 75L, 75R support the main cowl stay members 73L, 73R so as to suppress bending of the main cowl stay members 73L, 73R. Since the input from the front side is received by the plurality of different points, the rigidity of the cowl stay 37 can be enhanced. With the enhanced rigidity of the cowl stay 37, the change in the attitude of the vehicle can be suppressed more.

In addition, the slant member 75L, 75R are each formed in a substantially inverted V shape pointing to the upper side of the vehicle. Since the slant members 75L, 75R are each formed in the substantially inverted V shape, the main cowl stay members 73L, 73R are bent when an excessively strong shock is inputted from the front side.

Since the slant members 75L, 75R are each formed in the substantially inverted V shape, they are liable to be bent in such a direction as to be projected upwards, at the vertex portions T, T of the substantially inverted V shape. In this case, the spacing Px between the main cowl stay members 73L, 73R and the slant members 75L, 75R is enlarged, so that the possibility of a change in the attitude of the vehicle is lowered. Besides, a shock-absorbing effect can be provided.

The cowl stay 37 has the center arm 78, and the arm portions connecting the center arm 78 to the main cowl stay members 73L, 73R, so that the rigidity of the cowl stay 37 can be further enhanced. Since the main cowl stay members 73L, 73R provided in the cowl stay 37 are supported by the center arm 78 and lower arm members 76L, 76R as the arm members 70 as well as by the slant members, the possibility of concentration of a load on the slant members 75L, 75R can be lowered, as compared with a case in which only the slant members 75L, 75R are provided. With the possibility of concentration of a load on the slant members 75L, 75R thus lowered, the slant members 75L, 75R can be rendered lighter in weight, and a reduction in the weight of the cowl stay as a whole can be realized.

Figure 7A:
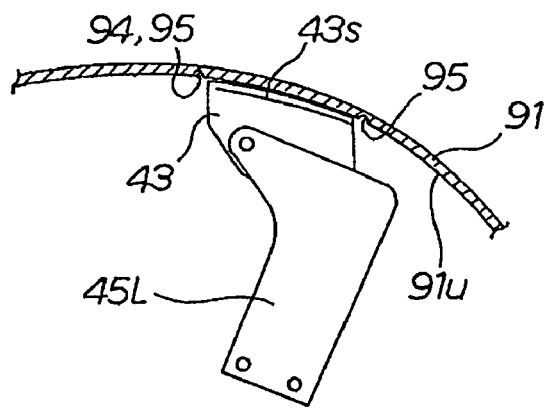
FIG. 7A is an illustration of an operation of the air bag module, showing the air bag module is in its non-operating state, according to the present invention.
Figure 7B:
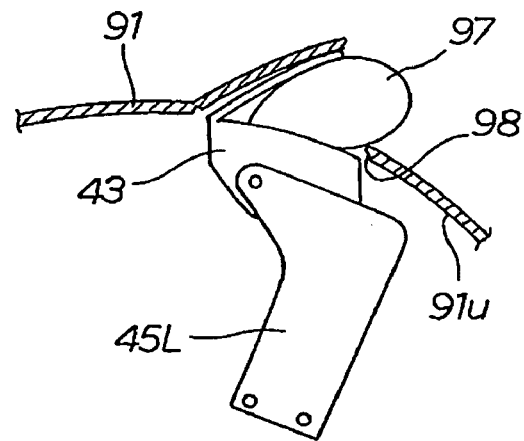
FIG. 7B is an illustration of an operation of the air bag module, showing the air bag module immediately upon its operation, according to the present invention.
Figure 7C:
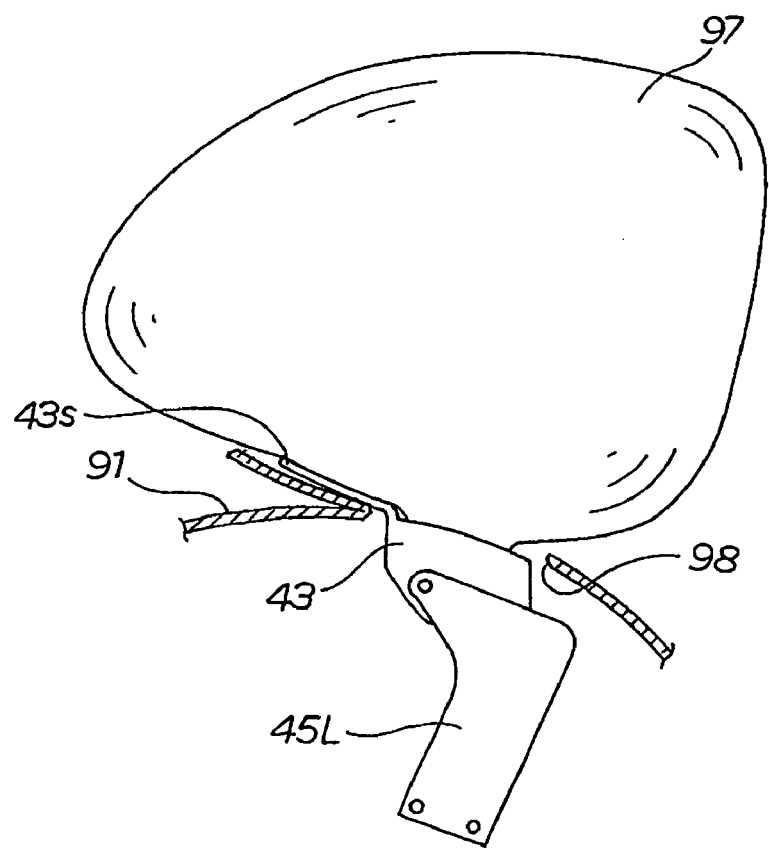
FIG. 7C is an illustration of an operation of the air bag module, showing the air bag module in operated state, according to the present invention.

FIGS. 7A through 7C illustrate the operation of the air bag module according to the present invention.

FIG. 7A is an illustration of the air bag module 43 in its non-operating state. The lower surface 91$u$ of the tank cover 91 is provided, at its portion fronting on the air bag module 43, with the fragile member 95 inclusive of the notch element 94 or the like. When the air bag module 43 is in its non-operating state, the air bag module 43 is covered with the tank cover 91, whereby the appearance quality of the vehicle can be maintained.

FIG. 7B is an illustration of the air bag module 43 immediately upon its operation. The lower surface 91$u$ of the tank cover 91 is provided, at its portion fronting on the air bag module 43, with the fragile member 95 inclusive of the notch element 94 or the like, and an upper surface part 43$s$ of the air bag module 43 is configured to be openable while being provided with a front hinge mechanism.

Therefore, when the air bag module 43 is operated, the upper surface part 43$s$ is opened by expansion of the air bag 97, and an opening 98 is formed in the fragile member 95, whereby expansion and inflation of the air bag 97 can be permitted to occur smoothly.

FIG. 7C is an illustration of the condition where the air bag module 43 is operated and the air bag 97 incorporated in the air bag module 43 is put into expansion and inflation. The air bag 97 is inflated toward the upper side of the tank cover 91.

In this illustrative embodiment of the present invention, the recess 89 in which the air bag module 43 is disposed is formed in the rear portion upper surface 41$bt$ of the fuel tank 41. However, the position of the recess 89 may be any position, such as a front portion and an intermediate portion, of the upper surface of the fuel tank 41.

If the recess 89 is disposed at an arbitrary position in the upper surface 41$t$ of the fuel tank 41, the air bag 97 can be disposed at such a position that the air bag 97 can be operated more effectively in relation to the rider, according to the size of the air bag 97 or the like factors.

Figure 8A:
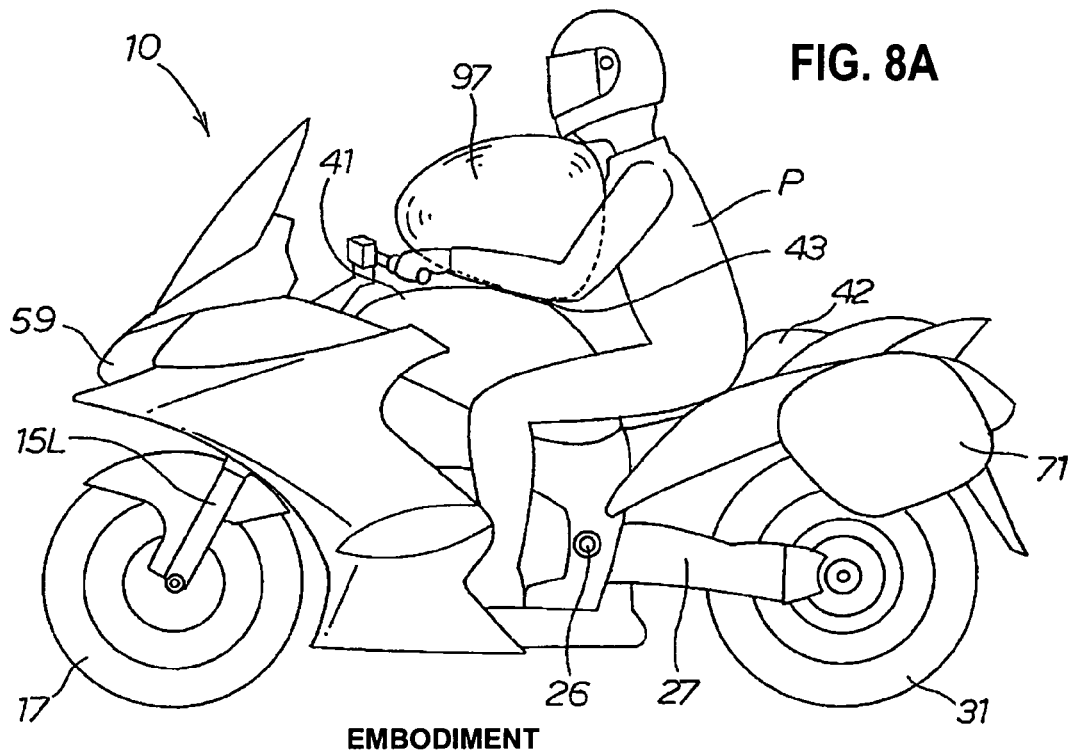
FIG. 8A is an illustration of the operation of the air bag module mounted on the motorcycle according to the present invention.
Figure 8B:
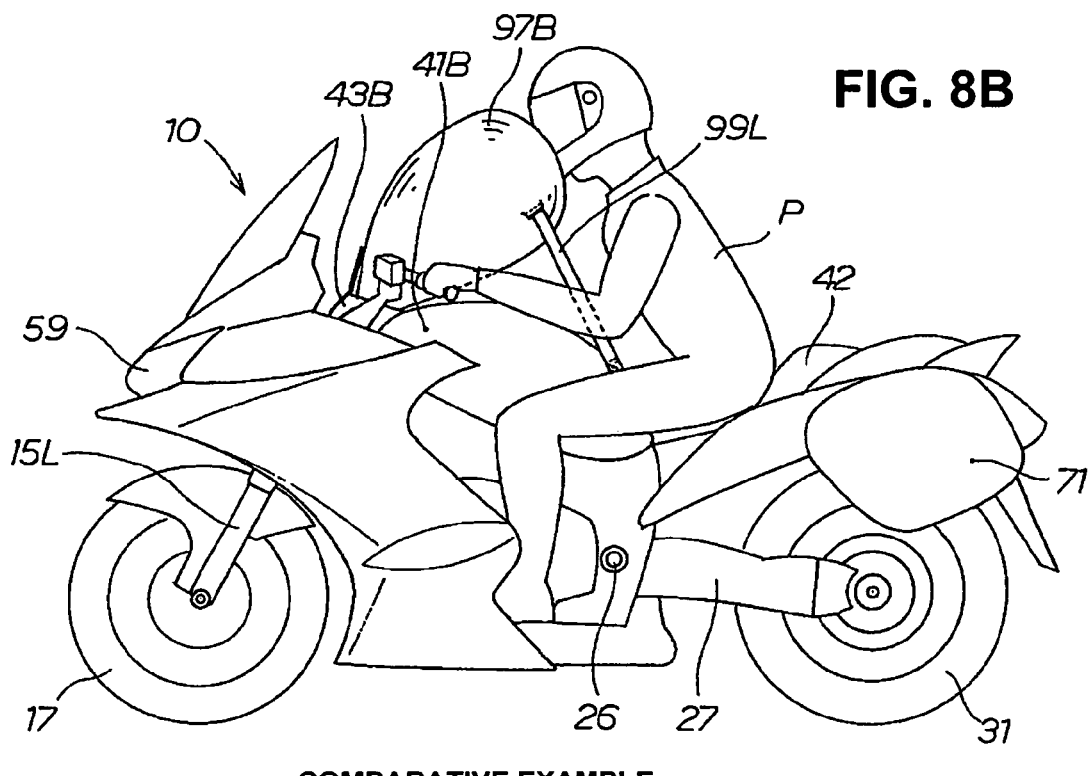
FIG. 8B is an illustration of the operation of the air bag module of a comparative example.

FIGS. 8A and 8B show an illustration of the operation of the air bag module provided in the motorcycle according to the present invention and an illustration of a comparative example.

FIG. 8A shows an embodiment of the present invention, illustrating that the air bag 97 disposed at the rear portion upper surface of the fuel tank 41 is inflated to come into contact with the rider P.

Since the air bag module 43 is disposed on the upper side of a rear portion of the fuel tank 41, the air bag module 43 is disposed to be closer to the rider, as compared with an arrangement in which the air bag module 43 is disposed in front of the fuel tank 41.

FIG. 8B shows a comparative example, illustrating that an air bag 97B disposed in front of a fuel tank 41B is inflated to come into contact with the rider P. In this example, the air bag module 43 cannot be disposed close to the rider.

From this point of view, as shown in FIG. 8A, when the air bag 97 is inflated, the inflated air bag 97 can be inflated at a predetermined position, without using any support belts 99L, 99R (only 99L on the viewer's side is shown in the drawing) for supporting the inflated air bag 97 at the predetermined position.

In addition, the fuel tank 41 is disposed between the air bag module 43 and the seat 42. On the other hand, in FIG. 8A, the air bag module 43 is disposed at the rear portion upper surface 41$bt$ of the fuel tank 41, whereby the air bag module 43 is disposed closer to the seat 42 occupied by a rider when operating the vehicle. Therefore, the time from the moment of inflation of the air bag 97 to the moment of contact of the inflated air bag 97 with the rider can be shortened, as compared with the case where the air bag module 43 is disposed in front of the fuel tank 41.

Referring now to FIG. 6, the motorcycle 10 is provided with the cowl stay 37, and the air bag 97 is mounted thereto. The provision of the cowl stay 37 ensures that, when the motorcycle 10 equipped with the air bag 97 receives an excessively strong shock from the front side, the change in the attitude of the motorcycle 10 is suppressed. With the change in the posture of the motorcycle 10 thus suppressed, the possibility of changes in the riding position and posture of the rider P is lowered.

Accordingly, when the air bag 97 is inflated, the positional accuracy in contact of the inflated air bag 97 with the rider P can be further enhanced, the air bag 97 is permitted to acts on the rider P more effectively, and the rider P can be protected more effectively.

While the motorcycle having both the cowl stay and the air bag module has been described in this embodiment, in an alternative embodiment, either one of the cowl stay and the air bag module may be omitted.

In a case where a motorcycle is provided with a cowl stay, the cowl stay 37 is disposed at a height above the center-of-gravity position G (FIG. 1) of the vehicle, so that the change in the attitude of the motorcycle 10 upon a head-on collision of the vehicle can be reduced more, as compared with a case where the cowl stay is disposed below or at the same level as the center-of-gravity position G of the vehicle.

Incidentally, while the present invention has been applied to a motorcycle in this mode for carrying out the invention, the invention is applicable also to a saddle ride type vehicle.

According to the first aspect of the present invention, the recess which is formed in the upper surface of the fuel tank and in which the air bag module is disposed may not necessarily be limited to a rear portion of the fuel tank but may be at a front portion or an intermediate portion of the fuel tank.

According to the second aspect of the present invention, the fuel tank, the air bag module and the stay members may not necessarily be entirely covered with the tank cover. Of these members, only partial portions of the members or only a partial region may be covered.

According to the third aspect of the present invention, the fragile member may be of any arbitrary structure that permits the air bag to be put into expansion and inflation smoothly at a predetermined time; for example, a notch, a thinned part or, further, a hinge structure may be adopted.

INDUSTRIAL APPLICABILITY

The present invention is preferably applicable to a motorcycle provided with an air bag module.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising
a head pipe;
left and right main frames extending rearwardly from said head pipe and respectively extending to left and right sides of the motorcycle;
first and second stay members extending respectively upwardly from said left and right main frames;
a fuel tank disposed between said left and right main frames;
a tank cover;
seat frames extending rearwardly from rear end portions of said left and right main frames, respectively;
a seat supported by said seat frames, said seat adapted to provide seating arrangement for a rider while operating the motorcycle; and
an air bag module arranged at a position proximate to a front upper portion of said seat;
wherein said air bag module is disposed on an upper portion of said fuel tank, and is operatively attached to said first and second stay members, and wherein said fuel tank, said air bag module, and said stay members are collectively covered with said tank cover.

2. The motorcycle as set forth in claim 1, wherein said upper portion of said fuel tank has a recess formed therein, and wherein said air bag module is disposed in said recess.

3. The motorcycle as set forth in claim 1, wherein said tank cover comprises a fragile member having a notch element disposed therein and facing said air bag module.

4. The motorcycle as set forth in claim 2, wherein said tank cover comprises a fragile member having a notch element disposed therein and facing said air bag module.

5. The motorcycle as set forth in claim 1, further comprising a fuel sub-tank, wherein:
said seat frames are arranged respectively on the left and right sides of said motorcycle;
said fuel sub-tank is disposed between said left and right seat frames when viewed from a top plan view of the motorcycle;
said fuel sub-tank is provided with a fuel pump for feeding fuel to the engine;
said fuel tank and said fuel sub-tank are connected to each other via a pipe for supplying fuel from said fuel tank to said fuel sub-tank; and
said fuel is supplied from said fuel sub-tank to said engine by said fuel pump.

6. The motorcycle as set forth in claim 2, further comprising a fuel sub-tank, wherein:
said seat frames are arranged respectively on the left and right sides of said motorcycle;
said fuel sub-tank is disposed between said left and right seat frames when viewed top plan view of the motorcycle;
said fuel sub-tank is provided with a fuel pump for feeding fuel to the engine;
said fuel tank and said fuel sub-tank are connected to each other via a pipe for supplying fuel from said fuel tank to said fuel sub-tank; and
said fuel is supplied from said fuel sub-tank to said engine by said fuel pump.

7. The motorcycle as set forth in claim 3, further comprising a fuel sub-tank, wherein:
said seat frames are arranged respectively on the left and right sides of said motorcycle;
said fuel sub-tank is disposed between said left and right seat frames when viewed top plan view of the motorcycle;
said fuel sub-tank is provided with a fuel pump for feeding fuel to the engine;
said fuel tank and said fuel sub-tank are connected to each other via a pipe for supplying fuel from said fuel tank to said fuel sub-tank; and
said fuel is supplied from said fuel sub-tank to said engine by said fuel pump.

8. A motorcycle comprising:
a main frame unit comprising
a head pipe;
left and right main frames extending rearwardly from said head pipe towards left and right sides, respectively; and
seat frames extending rearwardly from rear end portions of respective said left and right main frames;
first and second stay members extending upwardly from respective said left and right main frames of said main frame unit;
a fuel tank disposed between said left and right main frames; said fuel tank having a recess formed therein at a rear upper portion thereof;
a tank cover;
a seat supported by said seat frames;
an air bag module supported by said stay members and disposed in said recess of said fuel tank;
wherein said air bag module is disposed in said recess at a position located proximate to a front portion of said seat, and wherein said fuel tank, said air bag module, and said stay members are collectively covered with said tank cover.

9. A motorcycle according to claim 8, wherein said tank cover comprises a fragile member having a notch element disposed therein and facing said air bag module.

10. A motorcycle according to claim 8, further comprising a fuel sub-tank, wherein:
said seat frames are arranged respectively on the left and right sides of said motorcycle;
said fuel sub-tank is disposed between said left and right seat frames when viewed from a top plan view of the motorcycle;
said fuel sub-tank is provided with a fuel pump for feeding fuel to the engine;
said fuel tank and said fuel sub-tank are connected to each other via a pipe for supplying fuel from said fuel tank to said fuel sub-tank; and
said fuel is supplied from said fuel sub-tank to said engine by said fuel pump.

11. A motorcycle according to claim 9, further comprising a fuel sub-tank, wherein:
said seat frames are arranged respectively on the left and right sides of said motorcycle;
said fuel sub-tank is disposed between said left and right seat frames when viewed from a top plan view of the motorcycle;
said fuel sub-tank is provided with a fuel pump for feeding fuel to the engine;

said fuel tank and said fuel sub-tank are connected to each other via a pipe for supplying fuel from said fuel tank to said fuel sub-tank; and said fuel is supplied from said fuel sub-tank to said engine by said fuel pump.

12. In a motorcycle including a frame unit having a head pipe, left and right main frames extending rearwardly from said head pipe towards left and right sides, respectively; and seat frames extending rearwardly from rear end portions of respective said left and right main frames; a fuel tank disposed between said left and right main frames, and a seat supported by said seat frames; the improvement comprising an arrangement for mounting an air bag module, said arrangement comprising:

stay members extending upwardly from respective said left and right main frames of said frame unit;

the fuel tank having a recess formed therein at a rear upper portion thereof;

the air bag module supported by said stay members and disposed in said recess of said fuel tank at a position located proximate to a front portion of said seat; and a tank cover; wherein said fuel tank, said air bag module, and said stay members are collectively covered with said tank cover.

13. A motorcycle according to claim 12, wherein said tank cover comprises a fragile member having a notch element disposed therein and facing said air bag module.

14. A motorcycle according to claim 12, further comprising a fuel sub-tank, wherein:

said seat frames are arranged respectively on the left and right sides of said motorcycle;

said fuel sub-tank is disposed between said left and right seat frames when viewed top plan view of the motorcycle;

said fuel sub-tank is provided with a fuel pump for feeding fuel to the engine;

said fuel tank and said fuel sub-tank are connected to each other via a pipe for supplying fuel from said fuel tank to said fuel sub-tank; and said fuel is supplied from said fuel sub-tank to said engine by said fuel pump.

* * * * *